(12) United States Patent
Fatehi et al.

(10) Patent No.: US 6,519,064 B1
(45) Date of Patent: Feb. 11, 2003

(54) SCALABLE ADD/DROP ARCHITECTURE FOR LIGHTWAVE COMMUNICATION SYSTEM

(75) Inventors: Mohammad Taghi Fatehi, Middletown, NJ (US); Bruce Lee Nelson, Middletown, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/336,543

(22) Filed: Jun. 19, 1999

Related U.S. Application Data

(60) Provisional application No. 60/089,966, filed on Jun. 19, 1998.

(51) Int. Cl.$^7$ ................................................ H04J 14/02

(52) U.S. Cl. ........................................ 359/130; 359/128

(58) Field of Search ................................ 359/130, 128, 359/127, 124, 119

(56) References Cited

U.S. PATENT DOCUMENTS

| | | | |
|---|---|---|---|
| 5,526,153 A | | 6/1996 | Glance ........................ 359/127 |
| 5,612,805 A | * | 3/1997 | Fevrier et al. ............... 359/124 |

(List continued on next page.)

OTHER PUBLICATIONS

Ellis., A. D., et al. "Dispersion compensating, reconfigurable optical add drop multiplexer using chirped fibre Bragg gratings." Electronics Letters Aug. 14, 1997, vol. 33, No. 17.*

H. Okayama, et al., "Dynamic wavelength selective add/drop node comprising fibre gratings and optical switches", Electronics Letters, Feb. 27, 1997, vol. 33, No. 5, pp. 403–404.

U.S. Patent Application Ser. No. 08/920391, entitled "Wavelength–Selective And Loss–Less Optical Add/Drop Multiplexer", filed Aug. 29, 1997, US 6122095A.

U.S. Patent Application Ser. No. 08/879929, entitled "A Reconfigurable Add–Drop Multiplexer For Optical Communications Systems", filed on Jun. 20, 1997, US 6035080A.

(List continued on next page.)

*Primary Examiner*—Leslie Pascal
*Assistant Examiner*—Christina Y Leung
(74) *Attorney, Agent, or Firm*—Gregory J. Murgia

(57) ABSTRACT

A scalable, reconfigurable, and cost-effective add/drop arrangement is provided which enables a wavelength division multiplexed (WDM) system to be upgraded to accommodate new or changing add/drop requirements without disruptions in existing service. The add/drop arrangement is based on a modular architecture wherein one or more modular optical routing devices are coupled in an optical fiber path to facilitate the selective adding/dropping of individual optical channels and to facilitate in-service upgrades without disrupting existing transmissions in the optical fiber path. In an exemplary embodiment, at least two directional optical transfer devices, such as optical circulators, are coupled to a drop path for dropping optical channels from the WDM signal, an add path for receiving optical channels to be added to the WDM signal, and a common path between the directional optical transfer devices. In the common path, at least one optical routing module is employed which is capable of receiving the WDM signal at an input and routing or otherwise switching the WDM signal to outputs, each of which can be coupled to one or more wavlength-selective modules. Each wavelength-selective module can be configured with an arrangement of optical filters, such as fiber gratings, and optical switches to facilitate the selective adding and dropping of one or more individual optical channels. Importantly, the optical routing module includes additional outputs for coupling to additional optical routing modules, additional wavelength-selective modules, and other components in order to accommodate changing add/drop requirements, which is an anticipated characteristic especially of metropolitan optical networks.

21 Claims, 7 Drawing Sheets

U.S. PATENT DOCUMENTS

| | | | |
|---|---|---|---|
| 5,712,932 A | | 1/1998 | Alexander et al. ............ 385/24 |
| 5,771,112 A | * | 6/1998 | Hamel et al. ................ 359/128 |
| 5,778,118 A | * | 7/1998 | Sridhar ........................ 385/24 |
| 5,867,291 A | * | 2/1999 | Wu et al. .................... 359/124 |
| 6,046,883 A | * | 4/2000 | Sharma et al. .............. 359/119 |

OTHER PUBLICATIONS

U.S. Patent Application Ser. No. 08/920390, entitled "Expandable Wavelength–Selective And Loss–Less Optical Add/Drop Ssyten", filed on Aug. 29, 1997, US 6122096A.

* cited by examiner

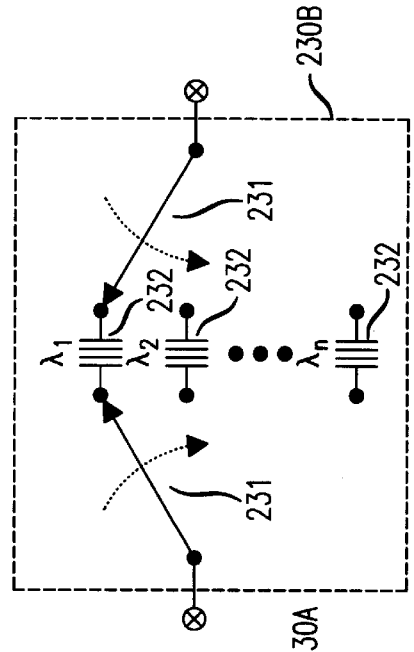
FIG. 4C
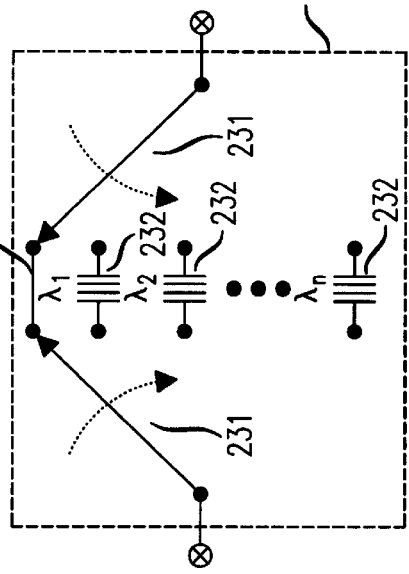
FIG. 4B
FIG. 4A
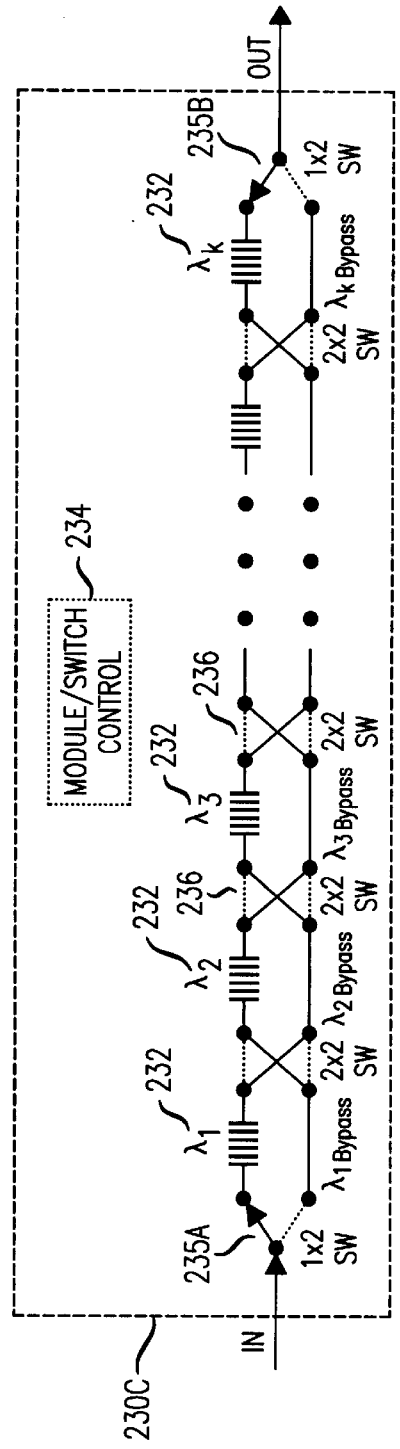
FIG. 4D

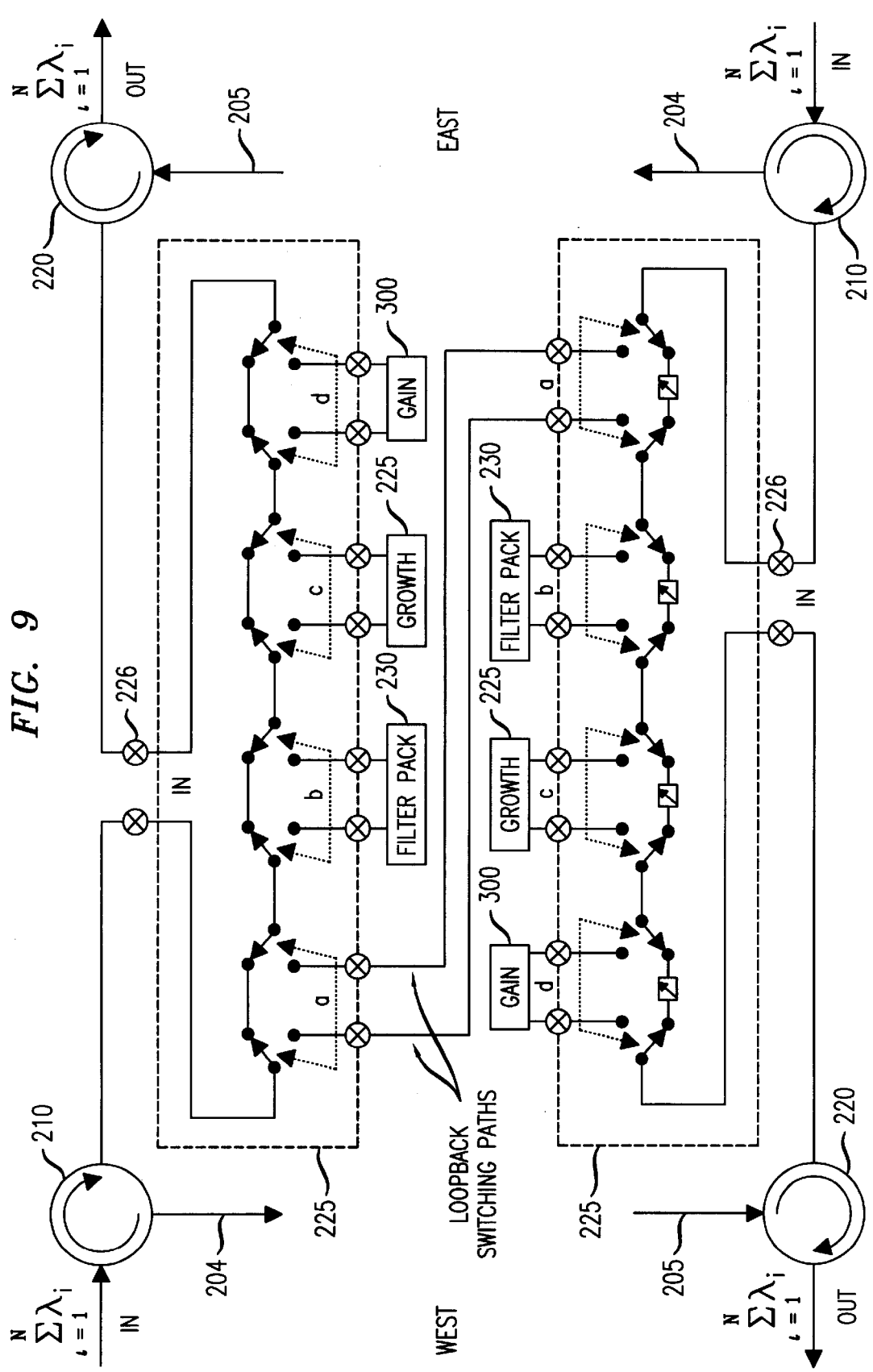

SCALABLE ADD/DROP ARCHITECTURE FOR LIGHTWAVE COMMUNICATION SYSTEM

CROSS REFERENCE TO RELATED APPLICATIONS

This application claims the benefit of U.S. Provisional Application Serial No. 60/089,966 filed on Jun. 19, 1998. This application is related to U.S. patent application Ser. No. 08/920,391 (Fatehi-21) and U.S. patent application Ser. No. 08/920,390 (Fatehi-22), both of which were filed on Aug. 29, 1997 and both of which are incorporated by reference herein.

FIELD OF THE INVENTION

This invention relates generally to lightwave communication networks and, more particularly, to add/drop arrangements for adding and dropping optical signals in lightwave communication systems.

BACKGROUND OF THE INVENTION

As is well known, wavelength division multiplexing (WDM) increases transmission capacity of lightwave communication systems. In particular, WDM combines many optical channels of different wavelengths for simultaneous transmission as a composite optical signal in a single optical fiber. At present, WDM has found widespread use in long-haul network applications and is now being contemplated for other applications such as metropolitan optical networks and the like.

In general, the capability to drop, add, or otherwise replace selected optical channels at multiple add/drop nodes in a WDM-based network is essential for a variety of value-added communication services including local access, interactive multimedia, wavelength leasing, and so on. Add/drop capability is especially important in metropolitan optical networks which are typically more densely populated with users in a more geographically limited area as compared to long-haul networks. As an example, metropolitan optical networks may include multiple optical rings each including multiple nodes at which traffic must be added and dropped. In addition to servicing the extensive add/drop requirements, management of bandwidth in these networks can be further complicated by such factors as flow of traffic, diversity of traffic types, and dynamic changes in traffic levels associated with adding and dropping of traffic at the various nodes. Consequently, flexibility in managing bandwidth and costs associated with supporting dynamically changing add/drop requirements have become significant issues in this environment.

Many different types of add/drop arrangements for WDM systems and networks are known. For example, in one type of add/drop system, a complete demultiplexing approach is used whereby an incoming WDM signal is demultiplexed at an add/drop node into individual optical channels of different wavelengths, one or more of the demultiplexed optical channels are then dropped, and the remaining optical channels along with any optical channels to be added are then multiplexed back into a composite WDM signal. A system of this type is disclosed in U.S. Pat. No. 5,526,153 entitled "Optical Channel Adding/Dropping Filter" issued on Jun. 11, 1996. In addition to the prohibitive cost associated with placing this type of demultiplexer/multiplexer arrangement at each add/drop node in a metropolitan optical network, for example, this arrangement also has other disadvantages such as spectral narrowing and signal power loss. In particular, spectral narrowing of the optical channel bandwidths can occur as the WDM signal is repeatedly demultiplexed and multiplexed through the various nodes. Moreover, signal power losses across each demultiplexer/multiplexer pair can be substantial, requiring insertion of costly optical amplifiers throughout the network. Additionally, all optical channels are demultiplexed/multiplexed at each node regardless of the number of optical channels actually being dropped and added.

Spectral narrowing can be reduced by employing fiber grating-based selective filters that avoid complete demultiplexing/multiplexing of the WDM signal (see, e.g., Okayama et al., "Dynamic wavelength selective add/drop node comprising fibre gratings and optical switches," Electronics Letters, Vol. 33, No. 5, pp. 403–404 (1997), U.S. Pat. No. 5,712,932 entitled "Dynamically Reconfigurable WDM Optical Communication Systems With Optical Routing Systems" issued Jan. 27, 1998, and U.S. patent application Ser. No. 08/879,929 entitled "A Reconfigurable Add-Drop Multiplexer for Optical Communications Systems," filed on Jun. 20, 1997. However, these type of add/drop arrangements are limited in terms of their scalability for accommodating new or otherwise dynamically changing add/drop requirements in networks such as metropolitan optical networks and the like. For example, upgrading these prior arrangements to accommodate add/drop requirements which were not contemplated in initial system design (e.g., to add/drop optical channels in a new wavelength band) would result in disruptions to existing service. More specifically, disruptions would occur when inserting the additional fiber gratings and switches in the existing transmission path to service the new add/drop requirements.

SUMMARY OF THE INVENTION

A scalable, reconfigurable, and cost-effective add/drop capability is provided according to the principles of the invention using a novel add/drop architecture which enables a wavelength division multiplexed (WDM) system to be upgraded to accommodate new and changing add/drop requirements without disruption in existing service. The add/drop arrangement according to the principles of the invention is based on a modular architecture wherein one or more modular optical routing devices are coupled in an optical fiber path to facilitate the selective adding/dropping of individual optical channels and to facilitate in-service upgrades without disrupting existing transmissions in the optical fiber path.

In an exemplary embodiment, at least two directional optical transfer devices, such as optical circulators, are coupled to a drop path for dropping optical channels from the WDM signal, an add path for receiving optical channels to be added to the WDM signal, and a common path between the directional optical transfer devices. In the common path, at least one optical routing module is employed which is capable of receiving the WDM signal at an input and routing or otherwise switching the WDM signal to outputs, each of which can be coupled to one or more wavlength-selective modules. Each wavelength-selective module can be configured with an arrangement of optical filters, such as fiber gratings, and optical switches to facilitate the selective adding and dropping of one or more individual optical channels. Importantly, the optical routing module includes additional outputs for coupling to additional optical routing modules, additional wavelength-selective modules, and other components in order to accommodate changing add/drop requirements, which is an anticipated characteristic especially of metropolitan optical networks. Because the additional add/drop requirements are serviced by adding components to available outputs of the optical routing modules instead of directly in the optical fiber path which is supporting existing service, in-service upgrades can be performed on the WDM system in a substantially non-disruptive manner.

By using wavelength-selective modules consisting of switches and optical filters, e.g., fiber gratings, the add/drop arrangement is reconfigurable in that one or more optical channels can be selectively added/dropped at a node. Moreover, the scalability problems of prior arrangements are overcome by using optical routing modules to accommodate additional add/drop requirements without disrupting existing service.

BRIEF DESCRIPTION OF THE DRAWING

A more complete understanding of the principles of the invention may be obtained from consideration of the following detailed description of the invention in conjunction with the drawing, with like elements referenced with like references, in which:

FIGS. 3A–3B show an exemplary embodiment of optical routing apparatus used in the scalable add/drop arrangement according to the principles of the invention, wherein FIG. 3A is a simplified functional diagram and FIG. 3B is a simplified schematic diagram;

FIGS. 4A–4D show exemplary embodiments of the wavelength-selective modules which can be used in the scalable add/drop arrangement according to the principles of the invention, wherein FIG. 4A is a simplified functional diagram and FIGS. 4B–4D are simplified schematic diagrams;

FIGS. 6A–6B show an exemplary embodiment of the gain module which can be used in the scalable add/drop arrangement according to the principles of the invention, wherein FIG. 6A is a simplified functional diagram and FIG. 6B is a simplified schematic diagram;

FIG. 9 shows an exemplary embodiment of the scalable add/drop arrangement in a bi-directional network application according to the principles of the invention.

DETAILED DESCRIPTION OF THE INVENTION

Although the illustrative embodiments described herein are particularly well-suited for adding and dropping optical channels in short haul applications such as wavelength division multiplexed (WDM) metropolitan optical networks and the like, and shall be described in this exemplary context, those skilled in the art will understand from the teachings herein that the principles of the invention may also be employed with other optical network architectures. For example, the scalable add/drop architecture may be used in dense WDM (DWDM) long haul applications, non-WDM systems, bi-directional and unidirectional line-switched and path-switched rings, and so on. Accordingly, the embodiments shown and described herein are only meant to be illustrative and not limiting.

Figure 1:
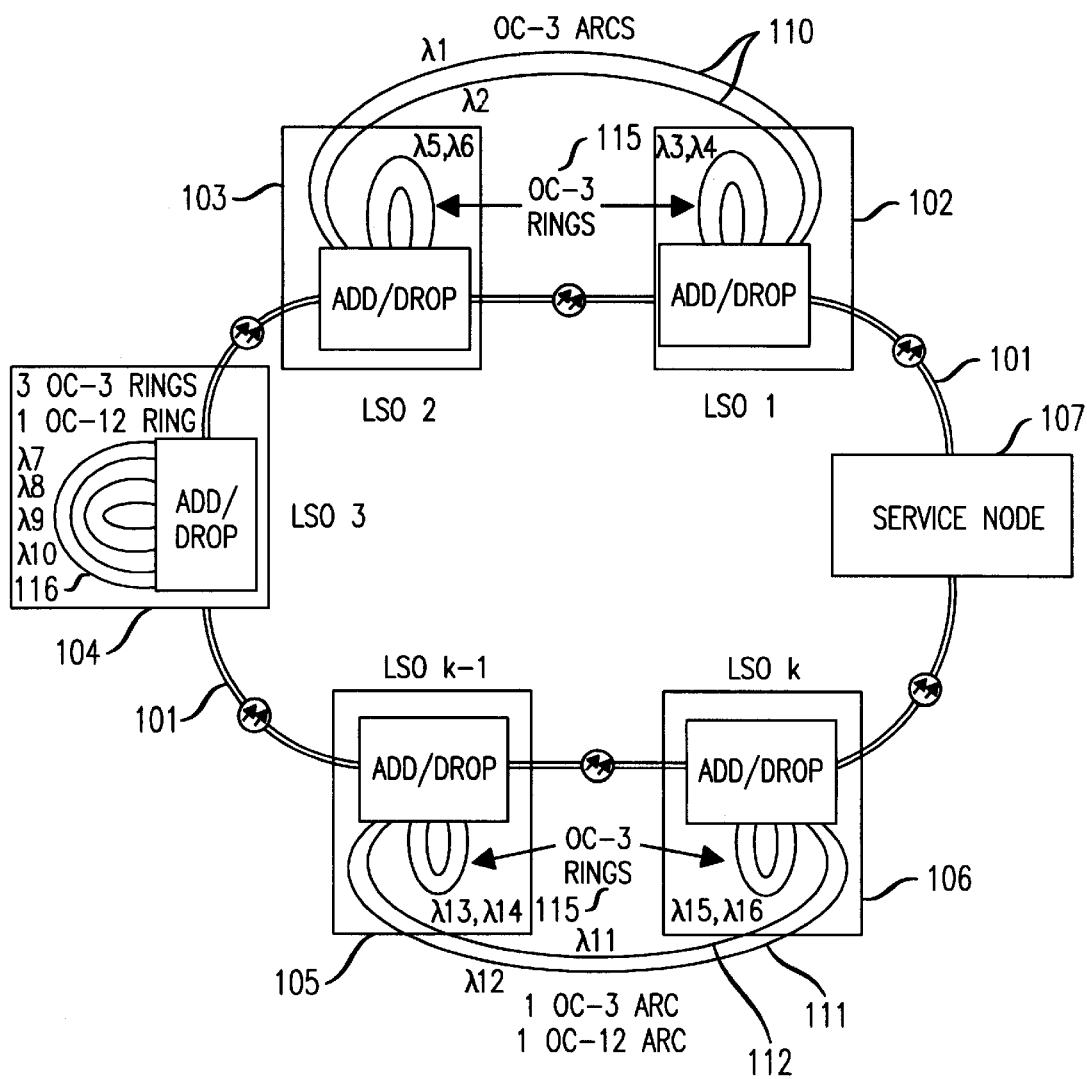
FIG. 1 shows an illustrative block diagram of a wavelength division multiplexed (WDM) metropolitan optical network in which the the principles of the invention may be used.

FIG. 1 shows one illustrative network application in which the principles of the invention may be employed. More specifically, FIG. 1 shows a WDM-based metropolitan optical network 100 having an optical ring architecture. In this exemplary configuration, network 100 includes a high capacity backbone transmission path 101, commonly referred to as an inter-office ring, which interconnects a plurality of local serving offices (LSOs) 102–106 to a central or service node 107. The local serving offices 102–106 may be central offices of a service provider, for example. In addition to other functions, service node 107 typically connects the inter-office ring to a higher capacity (e.g., DWDM) long haul core optical network (not shown). Network 100 is shown to be at least a 16-wavelength system ($\lambda_1$–$\lambda_{16}$).

As shown, the local serving offices 102–106 may be further coupled to each other via so-called arcs, e.g., the well-known SONET OC-3 arcs 110 shown connecting local serving offices 102 and 103 as well as SONET OC-3 arc 111 and SONET OC-12 arc 112 connecting local serving offices 105 and 106. Additionally, each of the local serving offices 102–106 may support a number of lower capacity distribution rings such as so-called access rings or access loops, e.g., SONET OC-3 access rings 115 at local serving offices 102–106 and SONET OC-12 access ring 116 at local serving office 104. In general, the local serving offices 102–106 will carry all of the loop and access traffic into service node 107.

As shown in FIG. 1, an add/drop capability may be required at each of local serving offices 102–106, service node 107, as well as at customer premises nodes (not shown) which would typically be connected via the lower capacity distribution rings. Even the simplified network shown in FIG. 1 highlights the significant add/drop requirements that may exist within a metropolitan optical network given the number of users serviced on each of the access rings and arcs as well as the add/drop requirements at any of the local serving offices and service node. Moreover, metropolitan optical networks tend to be evolutionary networks in that a customer may engineer an initial network configuration and then build upon that basic configuration by adding backbone ring overlays, multiple access rings, and so on in order to support new customers who may be added to the network.

Accordingly, add/drop requirements in these types of networks are anticipated to be very dynamic and most certainly will grow over time eventually exceeding the initial contemplated network design. As previously described, these type networks represent a cost-sensitive environment in that customers prefer starting with an initial network and then expanding that network as capacity and access requirements increase and to do so by paying as they go, e.g., as the network expands. This approach can be contrasted with the approach of architecting and financing a system at the front end which anticipates the evolutionary add/drop needs, for example. As previously explained, the prior art add/drop arrangements are based on this latter premise and, as a result, are costly (pay for whole network at startup even though a much less percentage of the fully loaded network is committed) and limited in their ability to expand beyond the initially architected requirements without disrupting service in the network.

Figure 2:
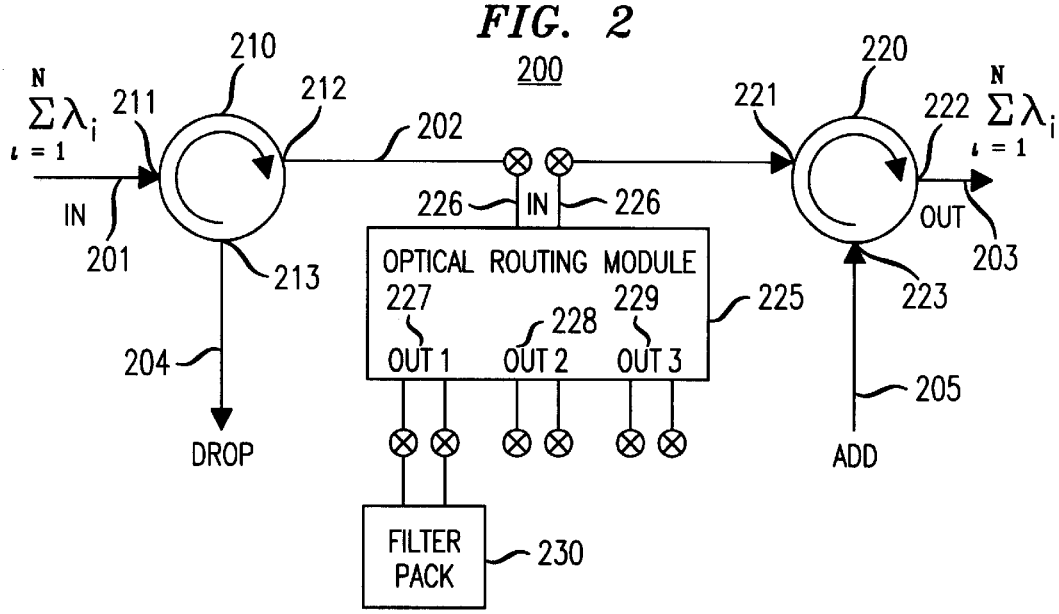
FIG. 2 shows an exemplary embodiment of the scalable add/drop arrangement according to the principles of the invention.

Referring now to FIG. 2, an exemplary embodiment of the add/drop arrangement according to the principles of the invention is shown. As shown, add/drop arrangement 200 includes a pair of directional optical transfer devices 210 and 220, an optical fiber 204 for dropping signals, an optical fiber 205 for adding signals, a common path 202 for coupling the directional optical transfer devices 210 and 220, an optical routing module 225, and a filter pack or module 230. It should be noted that directional optical transfer devices 210 and 220 are shown in this exemplary embodiment to be 3-port optical circulators, and will be referred to as such hereinafter in the description. However, it is contemplated by the teachings herein that other suitable devices for routing optical signals may be employed according to the principles of the invention. For example, a directional coupler, such as a fused fiber coupler, is a well-known device which may be substituted for the 3-port optical circulator as will be described in more detail below.

More specifically, optical circulator 210 includes an input port 211 coupled to optical fiber 201 for receiving an input signal, shown here in this exemplary embodiment to be a multi-wavelength WDM signal having optical channels of wavelengths $\lambda i$ where i=1 to N. Optical circulator 210 further includes an output port 212 coupled to optical fiber 202 and a drop port 213 coupled to optical fiber 204 which will serve as a drop path as will be described in more detail. Similarly, optical circulator 220 includes an input port 221 coupled to optical fiber 202 and an output port 222 coupled to optical fiber 203 for supplying an output signal, shown here in this exemplary embodiment to be a multi-wavelength WDM signal having optical channels of wavelengths $\lambda i$ where i=1 to N. Optical circulator 220 further includes a add port 223 coupled to optical fiber 205 which will serve as an add path as will be described in more detail. Optical routing module 225 is coupled between optical circulators 210 and 220 via optical fiber 202. As shown, optical routing module includes one or more input ports 226 and a plurality of output ports, shown in this exemplary embodiment as output ports 227–229. A filter pack or module 230, which will be described in more detail below, is coupled to output port 227 of optical routing module 225, while the remaining output ports 228–229 are available for accommodating add/drop growth requirements.

In operation, optical circulator 210 receives a WDM signal having a plurality of optical channels of different wavelengths at input port 211. Using well-known principles of operation, optical circulator 210 transfers substantially all of the optical energy of the WDM signal to optical fiber 202 via port 212. Optical routing module 225 receives the WDM signal and, in combination with filter module 230, selectively reflects one or more optical channels of particular wavelengths to be dropped from the WDM signal. These reflected optical channels are routed back toward optical circulator 210 via optical fiber 202 and transferred by optical circulator 210 to drop path 204 via drop port 213. For simplicity of explanation and illustration, the specific components for retrieving the dropped optical channels from drop path 204 are not shown since there are many well-known techniques for accomplishing the filtering and receiving functions (see, e.g., U.S. patent applications Ser. No. 08/920,391 (Fatehi-21) and Ser. No. 08/920,390 (Fatehi-22), both of which are incorporated by reference herein). The specific details of operation of optical routing module 225 and filter module 230 will be described in further detail below. The remaining optical channels which are not to be dropped are routed by optical routing module 225 and filter module 230 onto optical fiber 202 toward optical circulator 220.

At optical circulator 220, optical channels to be added to the WDM signal are supplied via add path 205 using well-known techniques (e.g., see U.S. patent applications Ser. No. 08/920,391 (Fatehi-21) and Ser. No. 08/920,390 (Fatehi-22). Optical circulator 220 routes these added optical channels via optical fiber 202 to one of input ports 226 of optical routing module 225. Optical routing module 225 and filter module 230 again are used to selectively reflect those added optical channels back toward optical circulator 220 where they are then supplied along with the remaining undropped optical channels as an output WDM signal via optical fiber 203.

Figure 3A:
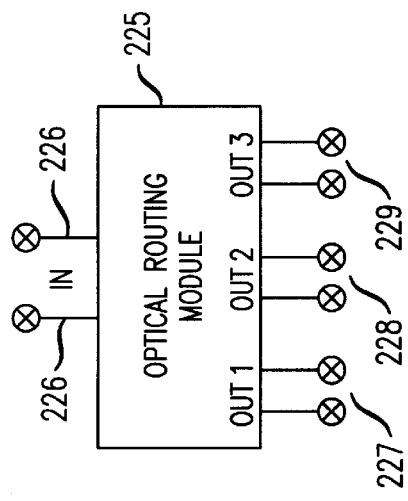

FIG. 3 shows an exemplary embodiment of optical routing module 225 which can be used in add/drop arrangement 200 in FIG. 2. FIG. 3A shows a functional depiction of optical routing module 225 with input ports 226 and output ports 227–229. It should be noted that these embodiments are illustrative only and that optical routing module 225 may include any number of inputs and outputs.

Figure 3B:
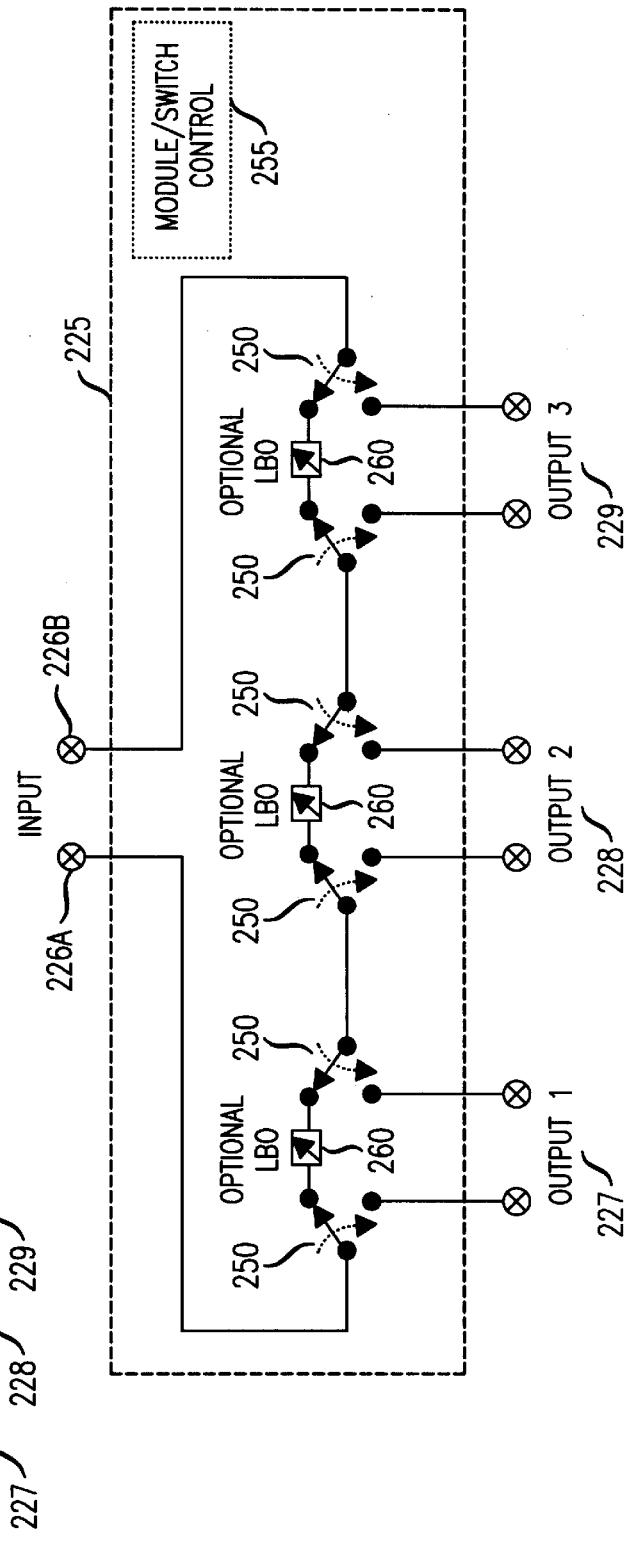

FIG. 3B shows a simplified schematic diagram of how optical routing module 225 can be implemented according to the principles of the invention. In the exemplary embodiment of FIG. 3B, optical routing module 225 employs a switch-based infrastructure using a plurality of 1×2 optical switches 250 in a concatenated arrangement whereby the switching function is under the control of module/switch controller 255. Optical switches 250 are commercially available from JDS-Fitel and other component manufacturers. It will also be apparent to those skilled in the art that the switching function carried out by optical switches 250 may also be achieved using other electromechanical optical switches, electro-optic switches, thermo-optic switches and so on. As such, the embodiments shown and described herein are meant to be illustrative only and not limiting in any way.

In its simplest form, optical routing module 225 is used to selectively route incoming signals from the input ports 226 to one or more output ports 227–229 for appropriate processing by modules connected to the respective output ports. Switches 250 are shown to have two switching states, a first one being a normal through state, e.g., when there are no connected modules at output ports 227–229 and a second switching state whereby the signals are directed to the connected module at the respective output port.

As previously described, input port 226A can be configured to receive a WDM signal from the direction of optical circulator 210 (FIG. 2) to facilitate the drop function while and input port 226B can be configured to receive the optical channels to be added via optical circulator 220 (FIG. 2). Well-known control techniques can be used in module/switch controller 255 to effect control over the switching operation of the various optical switches 250. For example, controller 255 may be operable to control each of switches 250 with one control bit. Moreover, switches 250 may be operated in a ganged arrangement under the control of controller 255. Generally, controller 255 would be linked to a system or network element-level controller, which may be further linked to a network controller, and so on. These types of hierarchical control arrangements are well-known.

In an add/drop operation, for example, a filter module (not shown) would be connected to one of output ports 227–229 of optical routing module 225. The structure and operation of the filter module will be described in further detail below, but for purposes of this discussion it is to be understood that the filtering of optical channels to be dropped from the WDM signal would occur in the filter module. In normal operation, an incoming WDM signal would enter input port 226A and be routed first to the leftmost optical switch 250. If no modules are connected to output ports 227–229, then each of switches 250 would be in a normal through state so that the WDM signal would be routed back onto optical fiber 202 (FIG. 2) via input port 226B.

In a drop operation where a filter module is connected, for example, to output port 227, the optical switch 250 corresponding to output port 227 would be switch the WDM signal to the connected module where appropriate filtering would take place. Any optical channels to be dropped from the WDM signal would be routed back to optical circulator 210 (FIG. 2) from input port 226A. The remaining optical channels not being dropped from the WDM signal would be appropriately switched through optical routing module 225 and routed from input port 226B to optical circulator 220 (FIG. 2).

Similarly for an add operation, optical channels to be added would be routed as previously described from optical circulator 220 via optical fiber 202 (FIG. 2) into input port 226B and then selectively routed using switches 250 to modules connected at one or more of output ports 227–229. Appropriate filtering would occur within the filter modules connected at output ports 227–229 so that the channels to be added would be routed back towards optical circulator 220 (FIG. 2) via input port 226B.

Optionally, line build out (LBO) elements 260 or other equivalent attenuation elements may also be included as desired in the transmission path to control the overall gain of the signal depending on the amount of gain desired and the number of signals being added/dropped in the system at any given time.

It should also be noted that various techniques for reducing losses and switching delays will be apparent to those skilled in the art and may be employed to minimize switching delays in optical routing module 225. For example, conventional switches may introduce delays in the system, e.g., some are known to switch on the order of 50msec or less. In this sense, any system employing switches has the potential for some disruption during the switching operations. However, techniques may be used to minimize this type of disruption, see, e.g., the switching arrangement described in U.S. patent application Ser. No. 08/879,929, which is herein incorporated by reference in its entirety.

Importantly, the other type of disruption, that relating to in-service upgrades of a system to accommodate new or changed add/drop requirements, is solved by the scalable add/drop architecture of the present invention. In prior arrangements, disruptions occur during system upgrades because service must be suspended (hours, days, weeks, etc) while the system is reconfigured and redesigned to support the new or changed add/drop requirements. By contrast, the modularity and scalability of the optical routing module 225 allows for non-disruptive, in-service upgrades.

More specifically, by using a switch-based infrastructure to route signals to connected modules as needed, the add/drop capability can be scaled on an "as needed" basis. This feature is particularly attractive from a cost perspective because a customer does not have to purchase and install a completely engineered system that anticipates current as well as future add/drop requirements. Instead, an initial startup may include one optical routing module which may accommodate additional filter modules and additional concatenated optical routing modules as the customer's add/drop requirements evolve. This aspect of the invention addresses the problems of prior arrangements where all add/drop components needed to be "in-line" during initial system startup or else operation would have to be disrupted while the additional add/drop components were added. More specifically, U.S. Pat. No. 5,712,932 is one such arrangement which is only reconfigurable in the sense that one or more optical channels can be selectively added/dropped, but the reconfigurable aspect is limited by whatever initial system design is in place. Stated otherwise, the system is not scalable or growable to accommodate new add/drop requirements in a non-disruptive manner. The add/drop arrangement according to the principles of the invention also supports scalability in terms of handling reduced add/drop requirements in a cost-effective and non-disruptive manner, e.g., simply removing modular packs while the system is still in-service.

FIG. 4A shows a functional depiction of filter module 230 used in add/drop arrangement 200 (FIG. 2). FIGS. 4B–4D show various exemplary embodiments of the filter modules which may be used. In general, filter module 230 is a wavelength-selective module that is used to selectively filter optical channels of particular wavelengths as they pass through a system. As shown in these exemplary embodiments, the filter modules comprise a combination/arrangement of fiber gratings and switches. Exemplary techniques for implementing filter module 230 are described in U.S. Pat. No. 5,712,932 and U.S. patent application Ser. No. 08/879,929 each of which is incorporated by reference herein. It should also be noted that filter module 230 may be implemented with other components that can provide the wavelength-selective filtering function. For example, temperature-tuned gratings, gratings tuned by mechanical strain, magnetically-tuned gratings, Fabry-Perot filters, and others devices may be used which possess the required wavelength-selectivity, reflective, and/or transmissive properties for routing optical channels of particular wavelengths.

Referring now to FIGS. 4B and 4C, there is shown two exemplary embodiments for filter modules 230A and 230B, respectively. As shown, each includes an arrangement of optical switches 231 and fiber gratings 232. Each filter module 230A–230B includes a plurality of fiber gratings, each of which can be tuned or otherwise programmed to a selected wavelength. In this example, each grating 232 is shown to reflective with respect to one wavelength, however, this is meant to be illustrative only. The only difference between filter module 230A and 230B is the addition of a normal through path 233 in filter module 230A. The normal through path 233 can be useful for certain system designs where it may be practical to keep a filter module connected but not to reflect any optical channels.

In operation, switches 231 are controlled (not shown) to route an input signal to any of the fiber gratings 232 according to the particular add/drop requirements. For example, the selected fiber grating 232 reflects the optical channel of a particular wavelength so that this optical channel can then be dropped or added as previously described. As with the optical routing module, switches 231 on the input and output side of filter modules 230 could be controlled in a ganged arrangement, e.g., switched together.

With regard to modularity and scalability, each filter module can be configured with n fiber gratings to reflect (for adding or dropping) any of the n wavelengths. By using a modular design, the system can be readily configured to support changing add/drop requirements without disrupting existing service. For example, different filter modules having fiber gratings tuned to different wavelengths can be substituted in the system or additional filter modules can be added as the system grows. This modularity therefore supports the "pay as you grow" approach for building a system as previously described.

FIG. 4D shows yet another exemplary embodiment of the filter module 230C according to the principles of the invention illustrative of a wavelength-selective capability in which any, none, or all of the wavelengths handled by a given filter module can be processed. In particular, an input signal is routed through an input 1×2 switch 235A followed by a series of 2×2 switches 236 and fiber gratings 232 and then through an output 1×2 switch 235B. As an example, if only $\lambda_1$ is selected to be dropped, then input 1×2 switch 235A would be switched to route the signal along the top path and through the first fiber grating 232. The optical signal having $\lambda_1$ would be reflected back and subsequently dropped as previously described and shown. The remaining optical channels would pass through the first fiber grating 232 (i.e., fiber grating would be in its transmissive state for the other wavelengths). The first encountered 2×2 switch 236 would be controlled to switch to its crossbar state and the remaining switches would be switched to their bar state so that the remaining signals are routed along the lower path to the output.

If more than one optical signal is to be dropped (e.g., $\lambda_2$ and $\lambda_3$), then input 1×2 switch 235A would be switched to route the signal along the bottom path (i.e., $\lambda_1$ bypass). The first encountered 2×2 switch 236 would be switched to its crossbar state and the next 2×2 switch would be in its bar state so that the input optical signal passes through the fiber gratings corresponding to wavelengths $\lambda_2$ and $\lambda_3$. The optical signals having $\lambda_2$ and $\lambda_3$ would be reflected back and subsequently dropped as previously described and shown. The remaining optical signals would pass through these fiber gratings 232. The next 2×2 switch 236 after the grating corresponding to $\lambda_3$ would be controlled to switch to its crossbar state and the remaining switches would be switched to their bar state so that the remaining signals are routed along the lower path (e.g., bypass route) to the output.

Accordingly, this combination of switching elements and gratings provides a more flexible architecture in which a single filter module can be used for selectively passing/reflecting any or all wavelengths supported in the filter module versus just one wavelength per filter module.

Figure 5:
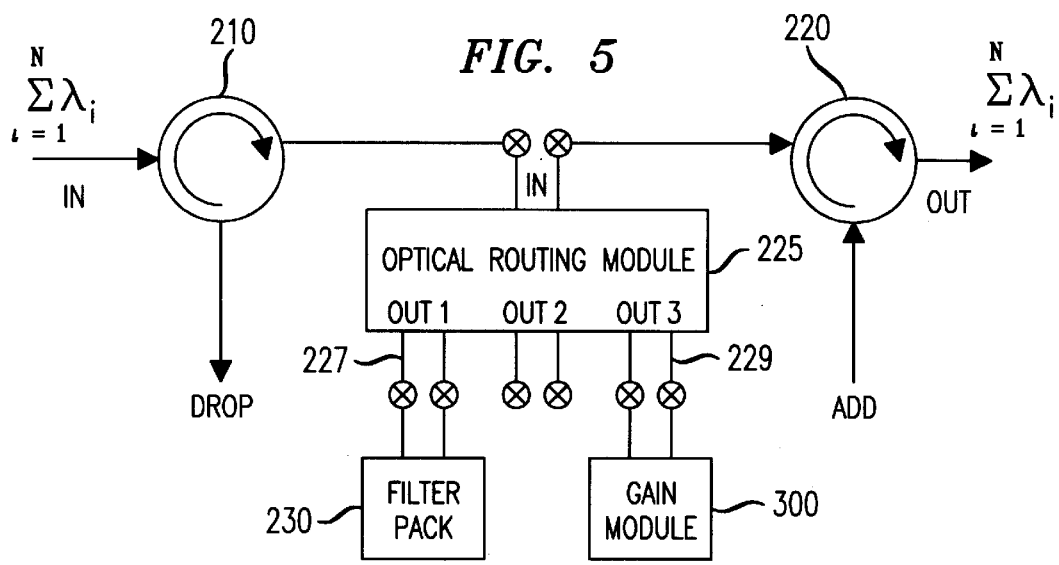
FIG. 5 shows another exemplary embodiment of the scalable add/drop arrangement according to the principles of the invention.

FIG. 5 illustrates another aspect of the invention, whereby a gain module 300 may be coupled to an output 229 of the optical routing module if amplification is desired. The remaining features and operation of components in FIG. 5 are the same as those previously described for FIG. 2 and will not be repeated here for sake of brevity.

Figure 6A:
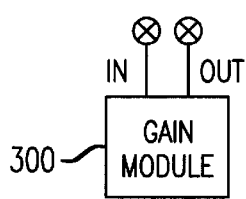
Figure 6B:
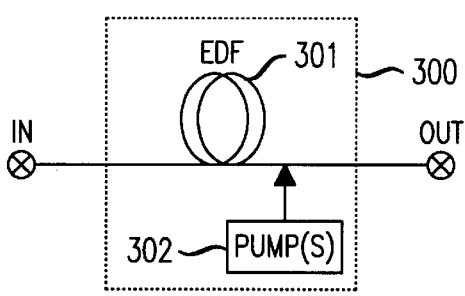

FIG. 6A illustrates a functional representation of gain module 300, while FIG. 6B represents an exemplary embodiment of gain module 300. More specifically, gain module 300 in FIG. 6B includes an in-line pumped fiber amplifier (e.g., erbium doped fiber) 301 and a pump source 302. It should be noted that this is just one illustrative embodiment and other amplification schemes may be substituted, e.g., microamplifiers, etc.

Figure 7:
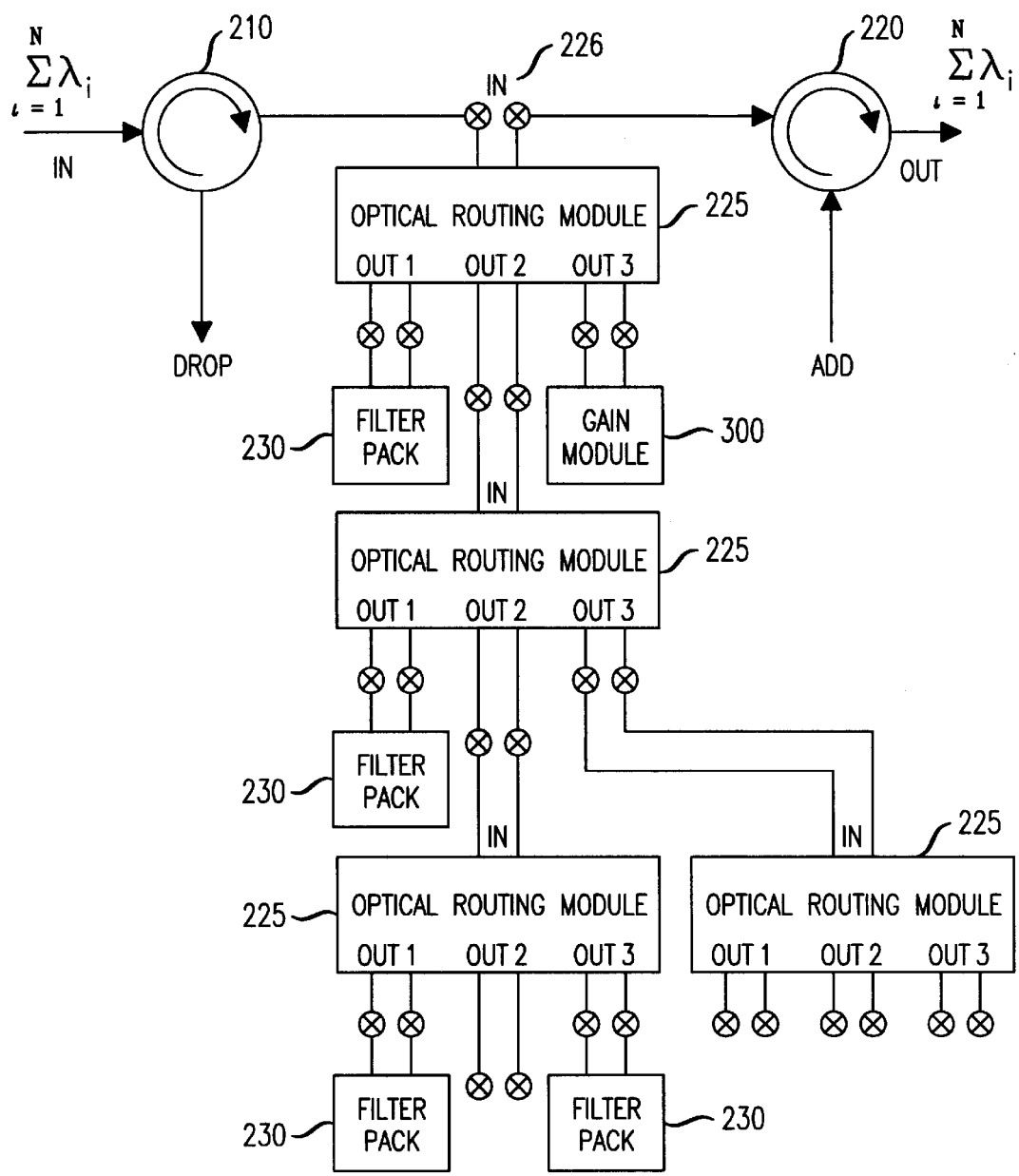
FIG. 7 shows another exemplary embodiment of the scalable add/drop arrangement according to the principles of the invention.

FIG. 7 shows the scalability of the add/drop architecture according to the principles of the invention. All features, components, and operation thereof are similar to those already described for the embodiments shown in FIGS. 2 and 5 and will not be repeated here for sake of brevity. However, FIG. 7 shows one example of how the add/drop capability can be upgraded on an "as needed" basis by simply adding in more optical routing modules 225, filter modules 230, and gain modules 300 to dynamically support changing add/drop requirements in a non-disruptive manner.

Figure 8:
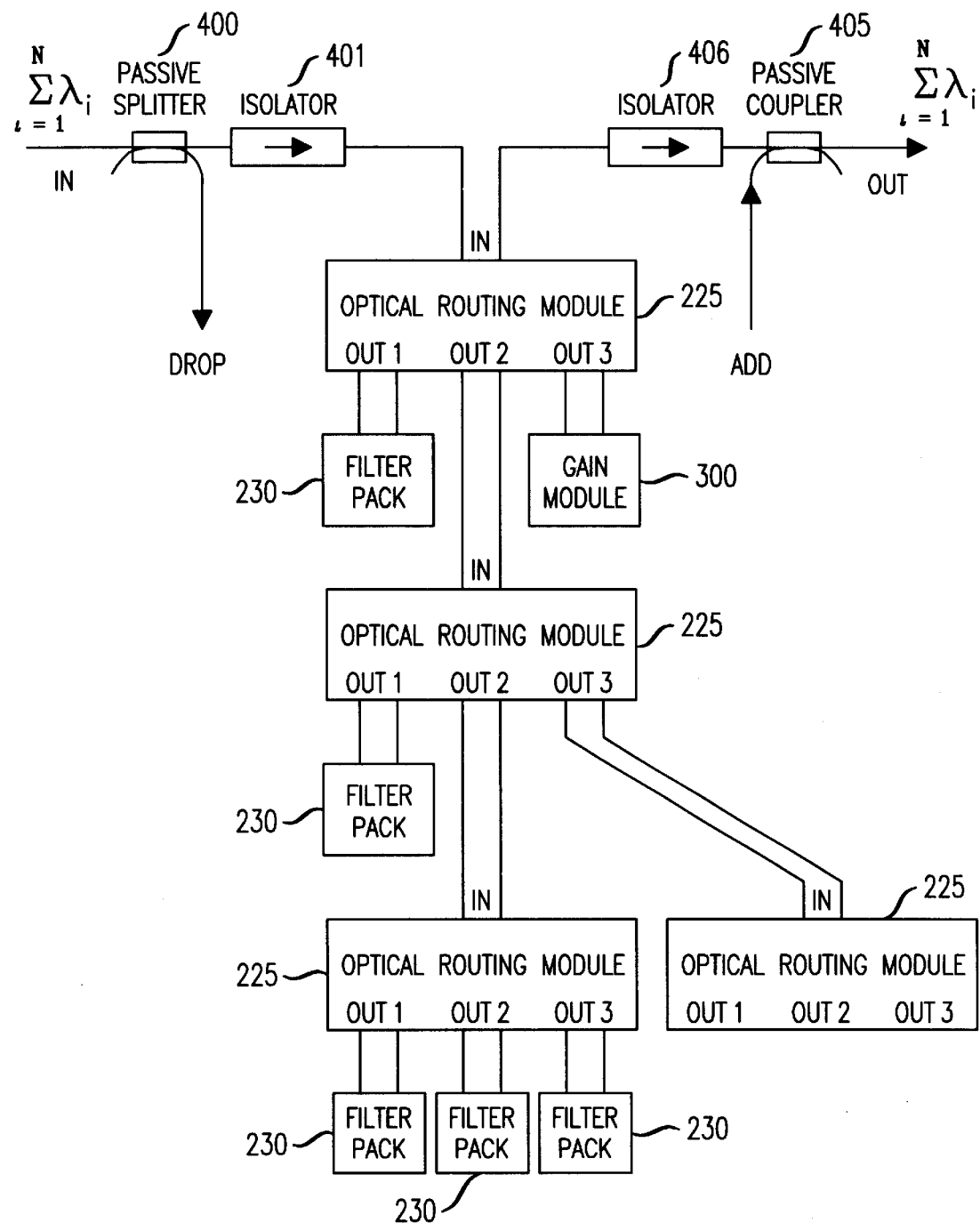
FIG. 8 shows an exemplary embodiment of the scalable add/drop arrangement in a drop and continue operation according to the principles of the invention.

FIG. 8 illustrates another aspect of the invention in which a drop and continue operation can be supported. As previously described, optical circulators 210 and 220 may be replaced by passive optical splitters/couplers such as couplers 400 and 405 as shown in FIG. 8. Isolators 401 and 406 are used for conventional reasons, e.g., preventing damage to components from backscattering. The use and operation of splitters and couplers is also well known. As shown, passive splitter splits/taps off a portion of the input optical signal from which individual optical channels can be dropped as previously described. The remaining signal power of the input optical signal passes through isolator 401 and is then processed through the add/drop arrangement as previously described. In this case, it may be desirable to include additional drop ports within the various modules, e.g., optical routing module 225, filter module 230 to facilitate any additional add/drop operations since the circulator function is no longer available. Passive coupler 405 can be configured to receive optical channels to be added to the outgoing WDM signal in a conventional manner. The remaining features and operation of components in FIG. 8 are the same as those previously described for FIGS. 2 and 5 and will not be repeated here for sake of brevity.

FIG. 9 shows one exemplary embodiment of the add/drop arrangement according to the principles of the invention in a bidirectional network application. In particular, this application involves two directions of communication, i.e., east to west and west to east. For example, this application may be used for an optical ring-based architecture. The filter modules 230, gain modules 300, and optical routing modules 225 may be coupled into the appropriate paths as shown. Most of the features and operation of components in FIG. 9 are the same as those previously described for previous embodiments, except for the fact that two directions of communication are being used, and will not be repeated here for sake of brevity. The significant difference is that available output ports from optical routing modules 225 may be used for providing loopback switching paths for protection switching applications between the east to west and west to east paths. Various well-known loopback switching techniques can therefore be used in accordance with the principles of the invention.

It will be understood that the particular embodiments described above are only illustrative of the principles of the present invention, and that various modifications could be made by those skilled in the art without departing from the spirit and scope of the present invention. For example, various modifications and component substitutions are contemplated for the wavelength-selective modules, gain modules, and optical routing modules described herein. Additionally, although the principles of the invention and the various embodiments have been described in the context of WDM-based metropolitan optical networks, the inventive principles may be used in any type network or system where it is desirable to selectively add/drop optical channels and to provide a non-disruptive upgrade feature. Accordingly, the scope of the invention is limited only by the claims that follow.

What is claimed is:

1. An apparatus for selectively adding/dropping individual optical channels of a wavelength division multiplexed (WDM) signal in a WDM system, the apparatus comprising:

an input for receiving the WDM signal;

an output for supplying the WDM signal; and an optical routing apparatus coupled between the input and the output, the optical routing apparatus having an input for receiving the WDM signal and a plurality of outputs, wherein each of the plurality of outputs is adapted to receive a wavelength-selective module for selectively filtering optical channels to be added/dropped, wherein the optical routing apparatus is capable of receiving additional wavelength-selective modules for upgrading add/drop capability in the WDM system in a substantially non-disruptive manner, and wherein the optical routing apparatus farther includes a plurality of switching elements for controllably routing the WDM signal between the input and the plurality of outputs of the optical routing apparats.

2. The apparatus according to claim 1, further comprising a controller for controlling the operation of the plurality of switching elements in the optical routing apparatus.

3. The apparatus according to claim 2, wherein each of the plurality of switching elements is individually controllable by the controller.

4. The apparatus according to claim 2, wherein selected ones of the plurality of switching elements are controlled as a group in a ganged arrangement by the controller.

5. The apparatus according to claim 1, further comprising an attenuation element associated with at least one of the plurality of switching elements so that attenuation can be selectively applied to the WDM signal.

6. The apparatus according to claim 1, further comprising at least a second optical routing apparatus coupled, in a concatenated arrangement, to one of the plurality of outputs of the optical routing apparatus.

7. An apparatus for selectively adding/dropping individual optical channels of a wavelength division multiplexed (WDM) signal in a WDM system, the apparatus comprising:

an input for receiving the WDM signal;

an output for supplying the WDM signal; and an optical routing apparatus coupled between the input and the output, the optical routing apparatus having an input for receiving the WDM signal and a plurality of outputs, wherein each of the plurality of outputs is adapted to receive a wavelength-selective module for selectively filtering optical channels to be added/dropped, wherein the optical routing apparatus is capable of receiving additional wavelength-selective modules for upgrading add/drop capability in the WDM system in a substantially non-disruptive manner, and wherein the optical routing apparatus further includes a plurality of switching elements for controllably routing the WDM signal between the input and the plurality of outputs of the optical routing apparatus, and wherein the wavelength-selective module includes an arrangement of switches and fiber gratings, wherein the switches are capable of directing the WDM signal through at least one fiber grating so that an optical channel of a particular wavelength is selectively reflected.

8. The apparatus according to claim 7, wherein the wavelength-selective module includes n fiber gratings, where n is an integer, wherein each of the n fiber gratings is adapted to be transmissive with respect to at least one wavelength and reflective with respect to at least one wavelength.

9. The apparatus according to claim 8, wherein each of the switches in the wavelength-selective module is switchable to couple the WDM signal to at least one of the fiber gratings.

10. The apparatus according to claim 8, wherein the wavelength-selective module further comprises a transmission path for bypassing the fiber gratings.

11. The apparatus according to claim 8, wherein one of the switches in the wavelength-selective module is an input switch for coupling the WDM signal from one of the plurality of outputs of the optical routing apparatus to one of the n fiber gratings and wherein another of the switches is an output switch for supplying the WDM signal back to the optical routing apparatus, at least one of the fiber gratings being coupled between the input switch and the output switch.

12. The apparatus according to claim 8, wherein the switches in the wavelength-selective module further comprise:

an input switch for receiving the WDM signal from one of the plurality of outputs of the optical routing apparatus;

an output switch for supplying the WDM signal back to the optical routing apparatus; and at least one intermediate switch coupled in an alternating arrangement with the fiber gratings between the input switch and the output switch, wherein the input switch, output switch, and intermediate switches are controllable to selectively route the WDM signal through selected ones of the fiber gratings.

13. An apparatus for selectively adding/dropping individual optical channels of a wavelength division multiplexed (WDM) signal in a WDM system, the apparatus comprising:

an input for receiving the WDM signal;

an output for supplying the WDM signal; and an optical routing apparatus coupled between the input and the output, the optical routing apparatus having an input for receiving the WDM signal and a plurality of outputs, wherein each of the plurality of outputs is adapted to receive a wavelength-selective module for selectively filtering optical channels to be added/dropped, wherein the optical routing apparatus is capable of receiving additional wavelength-selective modules for upgrading add/drop capability in the WDM system in a substantially non-disruptive manner, and wherein the optical routing apparatus further includes a plurality of switching elements for controllably routing the WDM signal between the input and the plurality of outputs of the optical routing apparatus, and wherein each of the plurality of switching elements in the optical routing apparatus is switchable between a first state for routing the WDM signal to a module connected to one of the plurality of outputs and a second state for bypassing at least one of the plurality of outputs.

14. An apparatus for selectively adding/dropping individual optical channels of a wavelength division multiplexed (WDM) signal in a WDM system, the apparatus comprising:

an input for receiving the WDM signal;

an output for supplying the WDM signal; and an optical routing apparatus coupled between the input and the output, the optical routing apparatus having an input for receiving the WDM signal and a plurality of outputs, wherein each of the plurality of outputs is adapted to receive a wavelength-selective module for selectively filtering optical channels to be added/dropped, wherein the optical routing apparatus is capable of receiving additional wavelength-selective modules for upgrading add/drop capability in the WDM system in a substantially non-disruptive manner, and wherein the WDM system is a bi-directional system having a first direction of communication along a first optical fiber and a second direction of communication in an opposite direction along a second optical fiber, wherein each of the first and second optical fibers includes an optical routing apparatus, and wherein a protection switching transmission path is selectively established between the optical routing apparatus in the first optical fiber and de optical routing apparatus in the second optical fiber.

15. An optical add/drop arrangement capable of adding/dropping at least one optical channel of a wavelength division multiplexed (WDM) signal in a WDM system, the arrangement including an input for receiving the WDM signal, an output for supplying the WDM signal from the add/drop arrangement, and first, second, and third optical transmission paths, wherein
the first optical transmission path is a drop path for carrying at least one optical channel being dropped from the WDM signal, the drop path optically communicating with the input, and the second optical transmission path is an add path for carrying at least one optical channel to be added to the WDM signal, the add path optically communicating with the output, Characterized in that:

the third optical transmission path is a common path coupled between the input and the output for carrying the WDM signal, the common path further comprising an optical routing apparatus having an input for receiving the WDM signal and a plurality of outputs, wherein each of the plurality of outputs is adapted to receive a wavelength-selective module for selectively filtering optical channels to be dropped and added, wherein the optical routing apparatus is capable of receiving additional wavelength-selective modules for upgrading add/drop capability in the WDM system in a substantially non-disruptive manner.

16. The arrangement according to claim 15, wherein the wavelength-selective module is capable of selectively filtering at least one individual optical channel to be dropped from the WDM signal via the drop path.

17. The arrangement according to claim 15, wherein the wavelength-selective module is capable of selectively filtering at least one individual optical channel to be added to the WDM signal via the add path.

18. The arrangement according to claim 15, further comprising:

a first optical transfer device including at least first, second and third ports, the first port for receiving the WDM signal, the second port for coupling to the common path, the third port for passing at least one optical channel to be dropped from the WDM signal; and a second optical circulator including at least first, second and third ports, the first port for coupling to the common path, the second port for supplying the WDM signal as output from the add/drop arrangement, the third port for receiving at least one optical channel to be added to the WDM signal, wherein the optical routing apparatus is coupled between the second port of the first optical transfer device and the first port of the second optical transfer device.

19. The arrangement according to claim 18, wherein the first and second optical transfer devices are selected from the group consisting of optical circulators and optical couplers.

20. The arrangement according to claim 15, wherein the optical routing apparatus further includes a plurality of switching elements for controllably routing the WDM signal between the input and the plurality of outputs of the optical routing apparatus.

21. The arrangement according to claim 20, wherein the wavelength-selective module includes an arrangement of switches and fiber gratings, wherein the switches are capable of directing the WDM signal through at least one fiber grating so that an optical channel of a particular wavelength is selectively reflected.

* * * * *